United States Patent [19]

Bonk et al.

[11] 4,001,507

[45] Jan. 4, 1977

[54] METHOD AND APPARATUS FOR TELEPHONE SYSTEMS FOR FACILITATING DATA TRAFFIC BETWEEN THE SUBSCRIBER STATIONS AND A CENTRAL DATA PROCESSOR

[75] Inventors: Franz Bonk; Wolfgang Burger, both of Munich, Germany

[73] Assignee: Siemens Aktiengesellschaft, Munich, Germany

[22] Filed: Feb. 12, 1975

[21] Appl. No.: 549,497

Related U.S. Application Data

[63] Continuation of Ser. No. 277,510, Aug. 3, 1972, abandoned.

[30] Foreign Application Priority Data

Aug. 6, 1971 Germany .......................... 2139546

[52] U.S. Cl. ............................................. 179/2 DP
[51] Int. Cl.² ......................................... H04M 11/06
[58] Field of Search ............. 179/2 DP, 2 R, 1 SA, 179/1 SG, 2 A, 3, 4, 1 B, 1 SM; 35/35 C; 340/172.5, 146.1 BA, 152, 153, 154; 178/3

[56] References Cited

UNITED STATES PATENTS

| 3,153,121 | 10/1964 | Crabtree et al. ................... 179/1 B |
| 3,344,401 | 9/1967 | MacDonald et al. ............ 179/2 DP |
| 3,431,362 | 3/1969 | Miller .............................. 179/1 SA |
| 3,507,997 | 4/1970 | Weitbrecht ...................... 179/2 DP |
| 3,529,088 | 9/1970 | Hauer .............................. 179/2 DP |
| 3,641,500 | 2/1972 | Greanias et al. .............. 340/152 R |
| 3,694,811 | 9/1972 | Wood .............................. 340/152 R |
| 3,732,541 | 5/1973 | Neubauer .................. 340/146.1 BA |

*Primary Examiner*—Thomas A. Robinson
*Attorney, Agent, or Firm*—Gerald L. Lett

[57] ABSTRACT

Method and apparatus are described for telephone systems over which data traffic can proceed and wherein individual subscriber stations can communicate directly with a data processor. The data is emitted from the processor, for example, in acoustic form. In addition appropriately formed data can be transmitted, as well, for operating a printing unit at the subscriber station. The latter data may be supplemented by further information in a code suitable for operating the printing unit and transmitted over the same communication path.

4 Claims, 3 Drawing Figures

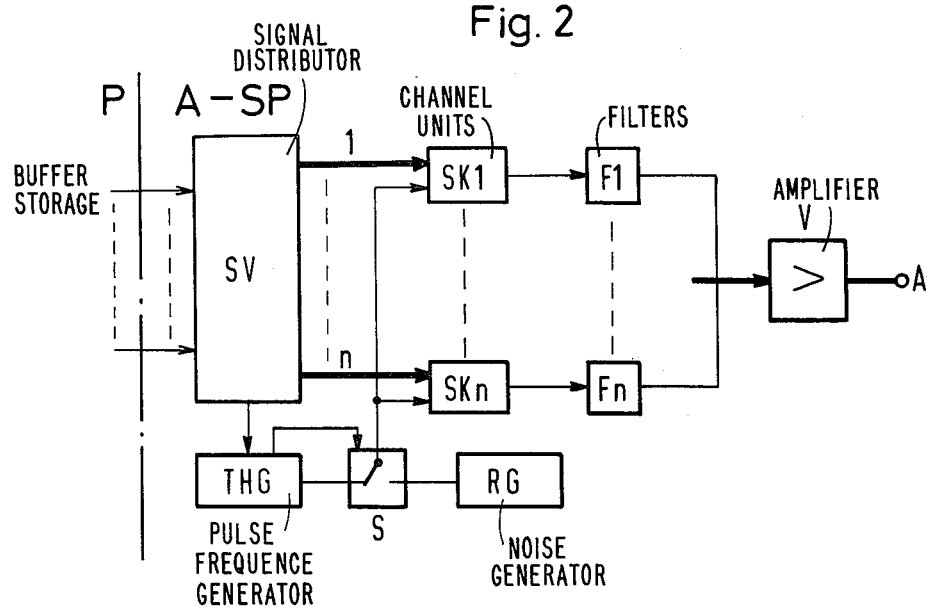

METHOD AND APPARATUS FOR TELEPHONE SYSTEMS FOR FACILITATING DATA TRAFFIC BETWEEN THE SUBSCRIBER STATIONS AND A CENTRAL DATA PROCESSOR

This is a continuation of application Ser. No. 277,510, filed Aug. 3, 1972, now abandoned.

BACKGROUND OF THE INVENTION

This invention relates to telephone systems over which data traffic may pass, and in particular, to those systems which permit communications with a data process.

For the transfer of data through telephone systems, it is well known in the art to provide data devices at the subscriber stations. These data devices are connected to the communication line by means of special alternating switches, and they enable data transmission over the telephone communication path. As a rule, these terminal units are very costly and complex and in many cases not needed at all. For example, the aforementioned data devices are not needed, if a central data processor can be dialed from various subscriber stations to obtain specific automatic announcements, such as statements of account, stock quotations, inventories, etc. or to execute orders. In these cases, the telephone itself can be employed as a terminal unit. Using the telephone instrument the data input is effected by means of the dialing system, while the data output occurs acoustically through the data processor in the form of sound or speech, and, thus, can be received over the telephone receiver.

A disadvantage in this type of data service having acoustic data output through the data processor is that in many cases a desired permanent recording of the conversation conducted with the data processor is lacking.

To overcome this deficiency a printer could additionally be provided in each subscriber set. The printer would be activated over a separate output unit and output line. This, however, would require a large amount of additional circuitry adding significantly to the cost and complexity of the system.

SUMMARY OF THE INVENTION

Accordingly, it is an object of this invention to overcome this deficiency and to provide a less complex form of printer control in a subscriber arrangement like that described above.

A solution to the problem provided by the invention lies in the fact that additional data is sent, if the data output occurs acoustically at the data processor and is sent in a form to the subscriber, suitable for controlling a printing unit at the subscriber station. If necessary this data can be supplemented by further data in a code suitable for the control of the printing unit over the same communication path.

In particular, in accordance with the invention the printer and telephone set are connected to the same subscriber line, and that subscriber line is coupled only to a single output channel of the data processor. Means are provided for insuring, after each speech output, the automatic repetition of the same information, if desired, by the same message in a different form for the control of the printer.

Using the foregoing principle there are other advantageous variations depending on the type of speech output involved. In the case of sound or similar speech output there can be connected in parallel with the sound or speech generator a converter for translating the control signals for the sound or speech generator into code characters equivalent to the acoustic data. This converter is, likewise, coupled at its output to the connecting path to the subscriber set with the same interface of the output channel of the data processor. Due to the restriction to sound or similar speech outputs, it is possible to convert the information coupled from the data processor to the sound or speech generator into equivalent code characters for printout control with little difficulty and with little expense. It should be noted that the same interface can be utilized for accepting the foregoing data.

A particularly effective solution, according to a further development of the invention, lies in the fact that, if sound or speech output is employed, the signals needed for the control of the printing unit at the subscriber station are, likewise, generated by the sound or speech generators allocated to the output channel. After the emission of the acoustic data, the equivalent code characters for the printing unit are fed to the sound or speech generators. In this case, the generators perform a double function, namely for producing the acoustic data output and for generating digital code characters for the purpose of controlling the printing unit. The conversion of the data occurs for each program through the data processor, so that additional converters are not required. The code characters to be emitted by the sound or speech generators are produced by simply scanning the individual frequency channels.

In such an arrangement it is desirable to obtain character signals of as even length as possible. The invention provides means, in a further development, so that, if a digital speech generator is employed, the frequency of the pitch generator is selected so high that, referred to the spectral channel (s) used, the rise time and the decay time of the channel filter (s) are negligibly small in relation to the frame frequency. This determines the duration of signal of the transfer code for the control of the printing unit and the activation of the speech generator through the data processor.

BRIEF DESCRIPTION OF THE DRAWINGS:

The principles of this invention will be most readily understood by reference to the description given hereinbelow of a preferred embodiment, constructed according to those principles, in conjunction with the drawings in which:

FIG. 2 is a schematic diagram of a preferred embodiment of the digital audio response device in the FIG. 1 embodiment and FIG. 3 is a chart illustrating the digital word construction of the data signals communicated from the data processor to the digital audio response device in the FIG. 1 embodiment.

Figure 1:
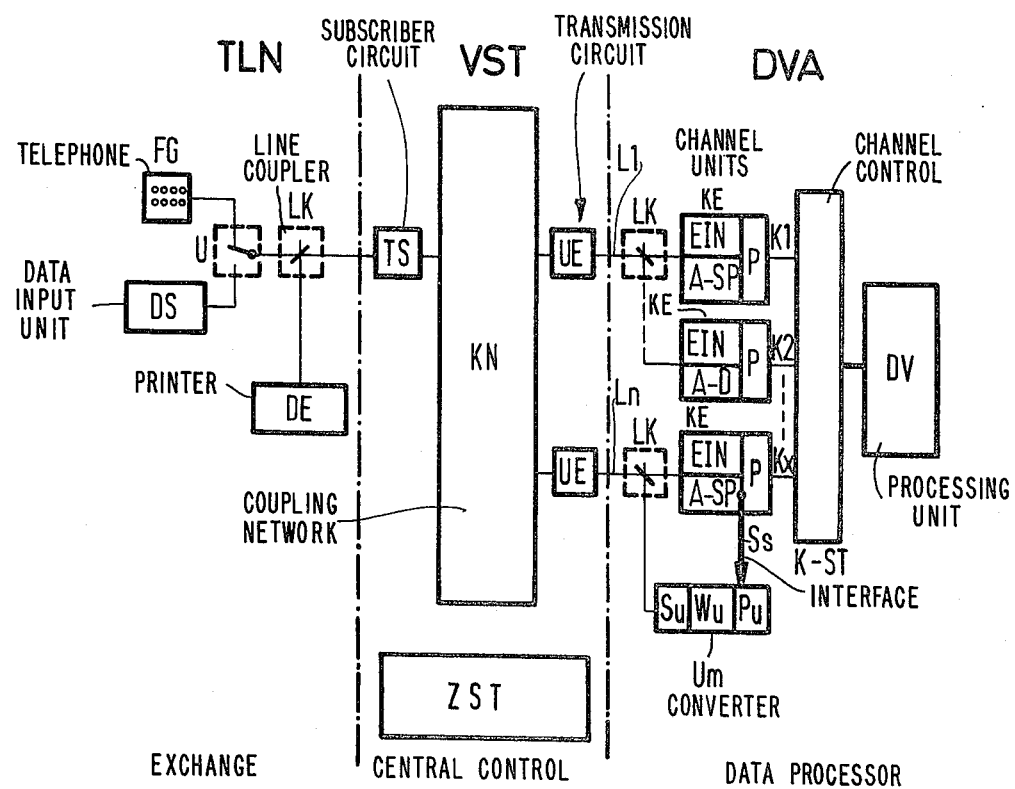
FIG. 1 is a simplified schematic diagram of a preferred embodiment of a telephone exchange system, a data processor and the means connecting them for data communications.

DETAILED DESCRIPTION OF THE DRAWINGS:

In FIG. 1 is shown in simplified form a block-schematic diagram of a complete system connecting a data processor with subscribers for telephone data traffic. Many of the elements constituting the various blocks in the diagrams are well known. Where more detailed descriptions are not given it is to be assumed that conventional construction is involved.

In FIG. 1 exchange TLN comprises a telephone set FG of known construction with touch-tone dialing, which is at the same time employed as a data processing terminal unit. Moreover, a further data input unit DS, e.g. a perforated strip transmitter or a data reader, may be connected over the alternation switch U to the telephone line; this switch, at the same time, connects a speaker system of the telephone set to the line. A printing unit DE of conventional construction is connected to the subscriber line via a line coupler LK, permitting activation of the printing unit when telephone station is employed as a data processing terminal. The subscriber line of the subscriber station is connected with the coupling network KN of exchanger VST of known construction via a subscriber circuit TS, which serves in the known manner to establish each desired connection under the control of a central control ZST. Further, outgoing transmission circuits UE are shown, over which run the connections to a data processor DVA.

The data processor is divided into a processing unit proper DV, a channel control K-ST having output channels $Kl$ to $Kx$, as well as channel units KE, which are allocated to the individual channels for the input and output of data via telephone subscriber lines $Ll$ to $Ln$. Each channel unit KE comprises an input part EIN for accepting the data transmitted from one of the subscriber stations TLN, an output unit A, as well as a common input and output buffer P. Depending on their use, the output units may be constructed as audio-response units A-SP or as output units for digital data, e.g. the output unit A-D.

The traffic between a subscriber station TLN and the data processor DVA takes place as follows. The subscriber reaches the inputs of the data processor by selecting a prescribed call number. The data processor then answers back with a steady tone. By selecting further numbers it is indicated what special program is desired. These last-mentioned, dialed numbers serve the operating program of the data processor as retrieval signals for loading and starting the desired program.

After the subscriber has started the dialogue with the desired program, the telephone keyboard serves as an input means for further data. The data processor answers back over the telephone. In the simplest case, specific sounds suffice as a reply. It is expedient in many cases that the data processor answers directly with spoken words. To accomplish this, it controls a digital or an analog audio response unit via the channel control.

Aside from the acoustic data output, the invention offers the possibility of additionally controlling a printing unit DE at subscriber station TLN, which establishes a record of the data dialogue being conducted. According to the proposal shown herein, telephone subscriber line $Ll$ is connected with a second channel unit KE having a printer output portion via a line coupler LK, and with a second channel K2 of channel control K-ST. The two channel units which thus operate on one and the same subscriber line are activated one after the other by the data processor DV and in this way the output data are transmitted successively in different forms, i.e. acoustic and digital characters, to the connected telephone subscriber line.

According to another proposal, the printing unit at the subscriber station is to be activated with reference to telephone line $Ln$. In this case, only one channel $Kx$ of channel control K-ST and one channel unit KE are needed. However, a special converter UM is coupled with this channel unit and comprises a buffer storage $Pu$, a converter $Wu$ to convert the data received from the data processor into equivalent code characters and a transmitter $Su$, which is coupled with the telephone subscriber line via a line coupler LK. The activation of converter UM takes place over the same interface SS of the channel unit through which the output component A-SP is also activated. Both units, the channel unit KE and the converter UM can cooperate such that all data coupled to the output component A-SP are routed concurrently to input buffer P of the converter, where they are stored until the acoustic data output is terminated. Certainly, this requires an increased storage capacity in the converter, but it eases the load on the data processor, since it need not activate the converter separately. However, this proposal can only be utilized with audio output or analog voice output, whereby the digital data fed to the audio-response unit A-SP from the data processor DV represent addresses in the form of syllables and words with which the voice components recorded analogously on a carrier may be selected.

The optimum possibility for activating a printing unit at the subscriber station is offered when audio output or digital voice output are used since the output components may concurrently be employed as a transmitter for controlling the printing unit. A prerequisite is that the sounds or sound combinations during the audio output or, as the case may be, the data determining the activating signals of the digital voice output are previously transformed into equivalent code characters, which then determine the scanning of the individual frequency channels. This transformation can be carried out without difficulty by the data processor DV itself.

For a better understanding of this procedure, which requires digital audio-response units, the basic construction and mode of operation of such units will be described with reference to FIGS. 2 and 3.

The block diagram of FIG. 2 shows a conventional signal distributor SV used as an input stage for the audio-response unit component A-SP. The necessary data are coupled to SV or input/output buffer P. To the signal distributor are connected spectral channels $l$ to $n$, each having a channel portion SK and a filter F connected thereafter. A pulse frequency generator THG is, likewise, connected to spectral channels $l$ to $n$. In addition to the pulse generator, a noise generator RG is provided. Depending on the need, both generators may be connected to the individual channel units $SKl$ to $SKn$ by switch S. The outputs of the individual filters $Fl$ to $Fn$ are connected to a common output amplifier V having output A.

The activation of the audio-response unit takes place such that, for example, every 20 ms., a pulse frame having 48 bits is delivered to input/output buffer P from the data processor. This pulse frame is divided into, e.g. as shown in FIG. 3, eight words W1 to W8, each having six bits B1 to B6, which are delivered selectively to the signal distributor SV of the audio-response unit A-SP and which together characterize the momentary speech spectrum. Word 1 indicates, with bits T1 to T6 for voiced sounds, the pitch of the fundamental voice frequency and, thus, the overall pitch. Voiceless sounds are, for example, characterized by the pattern 000111, which causes the connection of the noise generator RG to the spectral channels by throwing the switch S. The words W2 to W8 contain, referred to the individual spectral channels, the data concerning the momentary performance. Thus, for example, the three bits SK11 to SK13 in word W2 refer to spectral channel 1 and the bits $Skn1$ to $Skn3$ in word 8 to spectral channel $n$.

The information coupled to the pulse frequency generator THG in the known manner exercises control over the frequency of the pulse generator and on the pulse width by means of a digital to analog converter (not shown). The pulses produced by the latter supply the excitation energy for the voiced sounds. The data coupled to the spectral units SK regulate by means of a digital analog converter (not shown), the amplitude of the pulses fed via switch S and from whose spectrum the channel frequency in question is subsequently filtered out.

Since it is possible, in the time slot pattern determined by the pulse frame frequency, to excite only one spectral channel or none at all, digital code characters may also be transmitted instead of voice elements, whereby both serial and parallel codes may be employed. The selection of the individual character channels is thereby directed to the other marginal conditions which are determined, for example, by the type of transmission channel, the selection procedure employed, as well as by the other characteristics of the system.

The level of the pulse frequency can also be an influencing factor. If the individual harmonics of the pulse frequency lie too close together, there is the danger that the various harmonics, even if differently attenuated, can pass a filter, so that the amplitude modulation is strengthened. A steady output signal having a maximum amplitude with respect to a selected spectral channel can be attained, if the controlling harmonic of the fundamental frequency of the pitch lies in the midband of the selected channel and, therefore, is not attenuated.

The level of the pulse frequency that occurs at maximum pitch influences, moreover, the duration of signal of the individual character elements. If the pulse frequency is 200 Hz, the start of the excitation of the selected channel may, for example, vary 5 ms at the most. Since this variation is possible during the building-up as well as during the decay of the channel filter, equally long character signals are not assured despite the prescribed pulse frame frequency. Equally long signal durations can only approximately be attained if the rise time and decay time of the channel filters remain small in comparison with the pulse frame frequency, but this occurs only if the pulse frequency at maximum pitch is selected to be as high as possible. If, for example, a pitch pulse of 500 Hz is selected, then the temporary tolerance of the channel excitation is reduced to 2 ms at the most. The number of related temporary variations thus becomes considerably smaller and assures a safe evaluation if a fixed time frame is employed.

Taking the internal code of the data processor DV as a basis, the following transliteration phases result. The characters in the internal code are first translated into characters of the transfer code. Subsequently, in the case of a serial character, each bit of the transfer code character is replaced by a pulse frame in accordance with FIG. 3. On the other hand, if a parallel code is employed, a single vocoder pulse frame suffices for each character.

The principles of this invention were described hereinabove in terms of a preferred embodiment, which is to be considered only as being exemplary of those principles. Many modifications to or changes in the described embodiment may be made within the spirit and scope of the invention as defined by the appended claims.

What is claimed is:

1. In apparatus for telephone systems interoperating with a data processor wherein data communication takes place between individual telephone subscriber stations having both telephone sets and printers and said data processor, said data being available upon demand at said data processor both in audio form and a form suitable for control of said printer, the improvement comprising:
    a plurality of subscriber line means connected, respectively, to each said subscriber station, and to both the telephone set and the printer thereat, and to a single output channel of said data processor and
    means for transmitting said data in said form suitable for controlling said printer following transmission of the same data in audio form.

2. The improved apparatus for telephone systems defined in claim 1 wherein said data processor includes an acoustic generator for transforming output data signals from said data processor into acoustic signals for transmission over a said subscriber line means and further comprising:
    digital data transmitting means comprising converter means connected in parallel with said acoustic generator for transforming said output data signals into code characters equivalent to said acoustic signals, said acoustic generator and said converter means being connected to the same subscriber line.

3. The improved telephone system apparatus defined in claim 1 wherein said data processor includes an acoustic generator for transforming output data signals from said data processor into acoustic signals for transmission over a said subscriber line means and wherein said acoustic generator comprises:
    means for generating code signals equivalent to said acoustic signals for operating said printing means and
    means connecting said acoustic generator to an output channel from said data processor, said means being adapted to transmit said code signals after transmitting said acoustic signals.

4. The improved telephone system apparatus defined in claim 3 wherein said acoustic generator includes:
    frequency generating means for generating the pitch for said acoustic signals and
    filter means connected to the output of said frequency generating means and having a characteristic such that the rise and fall times of said filter means are negligibly small relative to the frame frequency of said code signals for operating said printing means, the frequency output of said frequency generating means being sufficiently high to produce this result.

* * * * *